K. TORNBERG.
ELECTRODE.
APPLICATION FILED MAR. 27, 1911.
1,057,016.
Patented Mar. 25, 1913.
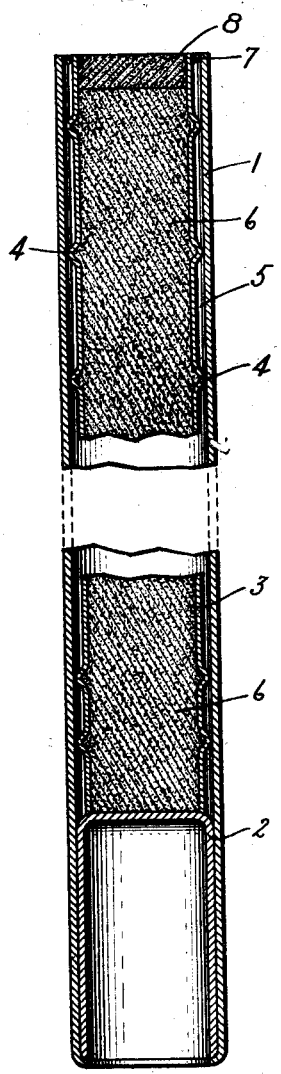
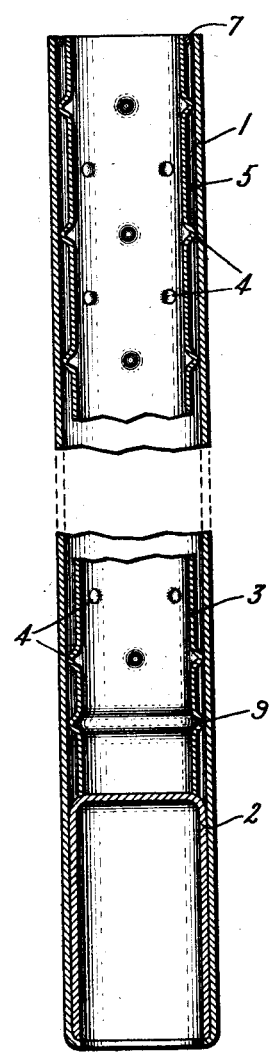
Witnesses:
George H. Tilden
J. Ellis Glen
Inventor:
Knut Tornberg,
by Albert G. Davis
His Attorney.

UNITED STATES PATENT OFFICE.

KNUT TORNBERG, OF LYNN, MASSACHUSETTS, ASSIGNOR TO GENERAL ELECTRIC COMPANY, A CORPORATION OF NEW YORK.

ELECTRODE.

1,057,016.  Specification of Letters Patent.  Patented Mar. 25, 1913.

Application filed March 27, 1911. Serial No. 617,066.

*To all whom it may concern:*

Be it known that I, KNUT TORNBERG, a citizen of the United States, residing at Lynn, in the county of Essex, State of Massachusetts, have invented certain new and useful Improvements in Electrodes, of which the following is a specification.

My invention pertains to an electrode, and particularly to an electrode producing a luminous arc, upon the end of which electrode a liquid pool is formed during normal operation.

It has hitherto been proposed to use, as the negative electrode, one in which the arc producing material is composed of a mixture of magnetite, rutile and chromite, and to inclose this mixture in an iron shell which provides sufficient conductivity for the electrode and to make the positive electrode of a very slowly consuming material, forming what is known in the art as a non-consuming electrode. An arc formed between electrodes of this character is much longer than the arc formed between carbon electrodes, and is commonly operated at a length of about an inch. When the arc is burning between electrodes of this character, a pool is formed on the negative electrode, which pool moves irregularly about its arcing face. Under certain conditions, however, and particularly when it is required that the negative electrode should be abnormally high in titanium content and should have a smaller diameter than usual, and should at the same time be run at a higher current than ordinarily employed, and particularly when the atmosphere is humid and hot, the tip of the electrode, especially during the first portion of its life, becomes very much rounded. Now the cathode blast issues from the negative electrode in a direction normal to the arcing surface of the electrode at that point, and, when the arc is burning near the edge of the electrode, the arc is bowed outwardly and is liable to rupture altogether. When the arc has been thus ruptured, the electrodes are again brought into engagement, and are again separated to strike the arc; the arc may then again be ruptured as before, and the process successively repeated, producing what is known in the art as "jumping." Furthermore, such an arc, even if it is not actually ruptured, is unsteady, and a further difficulty is encountered in the use of a negative electrode tending to form a rounded end, in that the arc is not struck with as great certainty between such an electrode and the non-consuming electrode as between an electrode presenting a flat surface and a corresponding non-consuming electrode. I have overcome these defects in an electrode of the character referred to by providing a second metallic shell and so arranging the two shells that a heat insulating annulus is formed between them.

For a fuller understanding of my invention, reference is had to the accompanying drawings, in which—

Figure 1 is a longitudinal section of my electrode and Fig. 2 is similar to Fig. 1 but with the arc forming material omitted to more clearly show the structure of the shells.

In these drawings, 1 indicates an outer metallic shell preferably of iron which may be closed at its lower end by a thimble 2 in the usual manner. An inner shell 3 is provided with a plurality of protuberances 4 which may be conveniently arranged in a series of vertical rows, the protuberances of adjacent rows being arranged in staggered relation to each other. An air space 5 is thus provided between the outer and inner shells which serves to thermally insulate the outer shell from the inner one. The upper end of the inner tube is provided with a seal 8. In Fig. 1, the inner shell 3 is shown filled with a luminous arc material 6, such as the magnetite mixture above noted, which is held within the shell by a seal 8, while in Fig. 2 the same structure is disclosed but without the filling mixture. It will thus be seen that a heat insulating annulus, which, in the example illustrated, is a layer of air, is formed between the outer and inner shells. If desired, a wire 7 placed between the outer and inner shells at the end of the electrode and a bead 9 formed on the inner shell at the opposite end of the electrode may assist in maintaining the two shells in spaced relation.

My theory of the reason for the double shells overcoming the defects hitherto noted in electrodes of the character described is that the portion of the electrode from which the arc burns should be kept at a high temperature, and this is accomplished by the second shell and the thermal insulating annulus between the two. At any rate, I have found that two such shells, with a heat insulating layer between the two, effectually accomplishes the desired object.

It will, of course, be understood that, while I have mentioned magnetite, rutile and chromite as a suitable electrode composition, my invention is not limited to these materials but may be used in any electrode in which a liquid pool is formed upon the end which becomes rounded during operation.

What I claim as new, and desire to secure by Letters Patent of the United States, is,—

1. An arc light electrode composed of a material yielding a luminous arc springing from a molten pool, inclosed within a metallic shell, said shell being surrounded by a second shell the internal diameter of which is greater than the external diameter of the outer shell, and means for maintaining said shells in spaced relation so that an air space is provided between the two shells.

2. An arc light electrode composed of a material yielding a luminous arc springing from a molten pool, inclosed within a metallic shell provided with outwardly extending and uniformly spaced protuberances, and an outer shell embracing the first and in frictional engagement with said protuberances.

3. An arc light electrode composed of a material yielding a luminous arc springing from a molten pool, inclosed within a metallic shell having its wall indented from within at a plurality of points to form a series of outwardly extending protuberances, and an outer shell embracing the first and in frictional contact with the said protuberances, whereby an annular air space is formed between the two shells.

In witness whereof, I have hereunto set my hand this twenty third day of March, 1911.

KNUT TORNBERG.

Witnesses:
JOHN A. MCMANUS, Jr.,
CHARLES A. BARNARD.